(12) United States Patent
Chellappa

(10) Patent No.: US 9,906,127 B2
(45) Date of Patent: Feb. 27, 2018

(54) FRACTIONAL OUTPUT VOLTAGE MULTIPLIER

(71) Applicant: NXP B.V., Eindhoven (NL)

(72) Inventor: Ananthasayanam Chellappa, Tempe, AZ (US)

(73) Assignee: NXP B.V., Eindhoven (NL)

( * ) Notice: Subject to any disclaimer, the term of this patent is extended or adjusted under 35 U.S.C. 154(b) by 270 days.

(21) Appl. No.: 14/497,699

(22) Filed: Sep. 26, 2014

(65) Prior Publication Data

US 2016/0094123 A1    Mar. 31, 2016

(51) Int. Cl.
*H02M 3/158* (2006.01)
*H02M 3/07* (2006.01)

(52) U.S. Cl.
CPC .......... *H02M 3/158* (2013.01); *H02M 3/073* (2013.01)

(58) Field of Classification Search
CPC .. H02M 3/07; H02M 3/073; H02M 2001/009; G11C 5/145; G11C 16/30
See application file for complete search history.

(56) References Cited

U.S. PATENT DOCUMENTS

| 5,790,393 | A |   | 8/1998 | Fotouhi |
| 6,483,728 | B1 | * | 11/2002 | Johnson ................ H02M 3/073 363/60 |
| 7,622,984 | B2 |   | 11/2009 | Lesso et al. |
| 8,008,964 | B1 |   | 8/2011 | Cook et al. |
| 8,823,443 | B2 |   | 9/2014 | Curatola et al. |
| 2006/0145747 | A1 |   | 7/2006 | Ucciardello et al. |
| 2013/0147543 | A1 |   | 6/2013 | Dai et al. |

FOREIGN PATENT DOCUMENTS

| CN | 101611532 A | 12/2009 |
| GB | 2425006 A | 10/2006 |
| WO | WO 00/52811 A1 | 9/2000 |
| WO | 2009047715 A1 | 4/2009 |

OTHER PUBLICATIONS

Extended European Search Report for Application No. 15184276.2 (dated Feb. 10, 2016).

* cited by examiner

*Primary Examiner* — Nguyen Tran
*Assistant Examiner* — Monica Mata

(57) ABSTRACT

Various circuits, apparatuses and methods are disclosed for generating a DC voltage conversion. In an example embodiment, an apparatus includes a DC voltage multiplier having a first capacitor. In a first mode, the first capacitor is charged to store a first voltage between first and second terminals of the capacitor. In a second mode, the DC voltage multiplier shifts a voltage of the second terminal up to a second voltage, thereby shifting the first terminal to a third voltage. The apparatus also includes a fractional output control circuit that when enabled, connects a second capacitor between the first terminal of the first capacitor and the ground reference voltage. The connecting of the second capacitor causes the first terminal of the first capacitor to be pulled down to a voltage between the first and third voltages when the second terminal is shifted up to the second voltage.

20 Claims, 3 Drawing Sheets

FRACTIONAL OUTPUT VOLTAGE MULTIPLIER

Aspects of various embodiments are directed to DC voltage converters and more particularly to DC voltage multipliers.

A voltage converter, such as a charge pump device or other device comprising voltage multipliers, is used to generate an output voltage that is higher than an input supply voltage. Voltage converters are used extensively in a wide variety of applications including, for example, data storage circuits, power management integrated circuits (ICs) and passive radio-frequency identification (RFID) communication. A voltage converter may have several voltage multipliers arranged in stages in a kind of cascade. A voltage multiplier charges a supply voltage in one or more capacitors and then reconfigures a set of switches to stacks or shifts the stored voltages to produce a higher voltage. The higher voltage is provided to an output or to a subsequent voltage multiplier stage as a higher supply voltage.

Various example embodiments are directed to circuits and methods for DC voltage conversion. In one example embodiment, an apparatus includes a DC voltage multiplier including a first capacitor. In a first mode, the DC voltage multiplier charges the first capacitor from an input voltage source having a first voltage to store a voltage potential between first and second terminals of the first capacitor. In the first mode, the second terminal is set to a ground reference voltage. After charging the first capacitor, the DC voltage multiplier transitions to a second mode. In the second mode, the DC voltage multiplier shifts a voltage of the second terminal of the first capacitor up to a second voltage and connects the first terminal to an output node. The shifting of the second terminal to the second voltage causes the first terminal to be shifted to a third voltage, which accounts for an accumulation of voltage from V1 and V2. The apparatus also includes a fractional output control circuit that, when enabled, connects a second capacitor between the first terminal of the first capacitor and the ground reference voltage. The connecting of the second capacitor causes the first terminal of the first capacitor to be pulled down to a voltage between the first and third voltages when the second terminal is shifted up to the second voltage.

In another embodiment, an apparatus includes a DC voltage multiplier including first and second capacitors. Each of the capacitors includes a respective first terminal and a respective second terminal. In a first mode, the DC voltage multiplier transfers energy from an input voltage source, having a voltage equal to a first voltage, to the first terminal of the first capacitor. In the first mode, the DC voltage multiplier also shifts the second terminal of the second capacitor to a second voltage, thereby shifting the first terminal of the second capacitor to a third voltage and transfers energy from the first terminal of the second capacitor to an output node. In a second mode, the DC voltage multiplier transfers energy from the input voltage source to the first terminal of the second capacitor. In the second mode, the DC voltage multiplier also shifts the second terminal of the first capacitor to the second voltage and transfers energy from the first terminal of the first capacitor to the output node. The apparatus includes a fractional output control circuit. When enabled, the fractional output control circuit connects a third capacitor between the first terminal of the first capacitor and a ground reference voltage. The fractional output control circuit also connects a fourth capacitor between a first terminal of the second capacitor and the ground reference voltage.

In another embodiment, a method for DC voltage conversion is provided. Using a DC voltage multiplier including first and second capacitors, a first output voltage is generated at an output node. The first output voltage is a multiple of the input voltage. A third capacitor is connected to the first capacitor and a fourth capacitor is connected to the second capacitor, thereby causing the voltage multiplier to generate a second output voltage that is less than the first output voltage.

The above discussion/summary is not intended to describe each embodiment or every implementation of the present disclosure. The figures and detailed description that follow also exemplify various embodiments.

Various example embodiments may be more completely understood in consideration of the following detailed description in connection with the accompanying drawings, in which.

Figure 1:
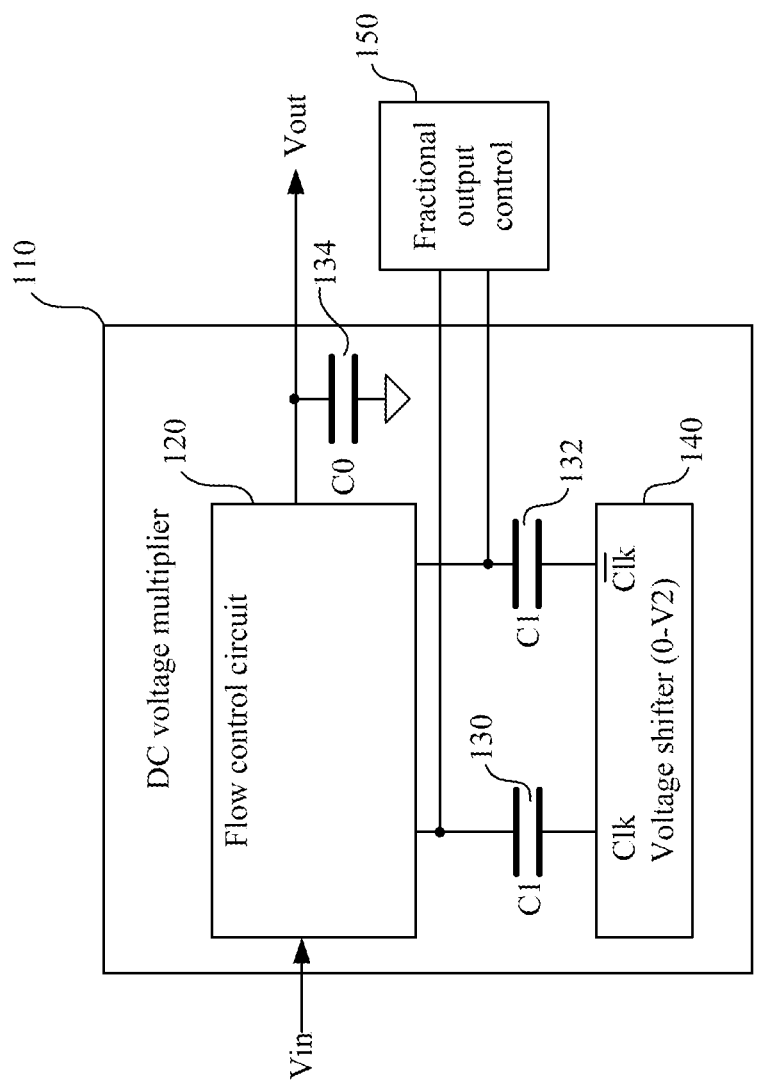
FIG. 1 shows a block diagram of a first voltage converter, consistent with one or more embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

Aspects of the present disclosure are believed to be applicable to a variety of different types of apparatuses, systems and methods involving DC voltage conversion. While not necessarily so limited, various aspects may be appreciated through a discussion of examples using this context.

Various example embodiments are directed to circuits and methods for generating a DC voltage conversion. In an example embodiment, an apparatus includes a DC voltage multiplier having a first capacitor. In a first mode, the DC voltage multiplier charges the first capacitor to store a first voltage (V1) between the first and second terminals of the capacitor. In a second mode, the DC voltage multiplier shifts a voltage of the second terminal up to a second voltage (V2), thereby shifting the first terminal to a third voltage (V3). The apparatus also includes a fractional output control circuit that, when enabled, connects a second capacitor between the first terminal of the first capacitor and the ground reference voltage. The connecting of the second capacitor causes the first terminal of the first capacitor to be pulled down to a voltage between the V1 and V3 voltages when the second terminal is shifted up to the second voltage.

In different implementations, the DC voltage multiplier may include various numbers of capacitors charged in alternate states of the DC voltage multiplier. For ease of explanation, the examples herein are primarily described with reference to a DC multiplier including two capacitors that are charged in different states of the DC voltage multiplier.

In some embodiments, an apparatus includes a DC voltage multiplier including first and second capacitors. Each of the capacitors includes a respective first terminal and a respective second terminal. In a first mode, a DC voltage multiplier transfers energy from an input voltage source, having a voltage equal to a first voltage V1, to the first capacitor, impressing this voltage across the first and second terminals. In the first mode, the DC voltage multiplier also shifts the second terminal of the second capacitor to a second voltage V2, thereby shifting the first terminal of the second capacitor to a third voltage V3, and transfers energy from second capacitor to an output node. In a second mode, the DC voltage multiplier transfers energy from the input voltage source to the second capacitor, impressing the voltage V1 across the first and second terminals. In the second mode, the DC voltage multiplier also shifts the second terminal of the first capacitor to V2, and transfers energy from the first capacitor to the output node. The apparatus includes a fractional output control circuit. When enabled, the fractional output control circuit connects a third capacitor between the first terminal of the first capacitor and a ground reference voltage. The fractional output control circuit also connects a fourth capacitor between a first terminal of the second capacitor and the ground reference voltage. Connecting the third capacitor pulls the voltage of the first terminal of the first capacitor down from V3 to a fourth voltage (V4), when the second terminal of the first capacitor is shifted up to V2. Similarly, connecting of the fourth capacitor pulls the voltage of the first terminal of the second capacitor down from V3 to V4, when the second terminal of the second capacitor is shifted up to V2.

When the first (or second) capacitor is charged to V1, shifting the second terminal of the first (or second) capacitor to V2 causes the first terminal to be shifted to V3, which is equal to V1+V2 if the fractional output control circuit is not enabled. Different implementations may use various voltage levels for the first and second voltages. In some implementations, V2 is equal to V1. In some other implementations, V2 may be different from V1.

When the fractional output control circuit is enabled, the first terminals of the capacitors in the voltage multiplier are pulled down to V4, that is a fraction of V3. As described in more detail with reference to the figures, V4 voltage is determined by the capacitance of a shifted capacitor of the voltage multiplier in relation to the capacitance of the capacitor, in the fractional output control circuit, that is connected thereto. In some implementations, V4 is equal to V1+((C1*V2)/(C1+C2)), where C1 is the capacitance of the shifted capacitor and C2 is the capacitance of the capacitor of the fractional output control circuit, that is connected thereto.

Turning now to the figures, FIG. 1 shows a block diagram of a first voltage converter, consistent with one or more embodiments. The voltage converter 100 includes a DC voltage multiplier 110. The DC voltage multiplier 110 includes capacitors 130 and 132, a flow control circuit 120, and a voltage shifter 140. The DC voltage multiplier 110 operates in two modes in which capacitors 130 and 132 are alternately charged and discharged. When the DC voltage multiplier 110 is operated in a first mode, the flow control circuit 120 transfers energy from an input voltage source Vin to charge capacitor 130 to a first voltage V1. In the first mode, the flow control circuit 120 also transfers energy stored in capacitor 132 to an output capacitor 134 connected to an output node (Vout). When the DC voltage multiplier 110 is operated in a second mode, the flow control circuit 120 transfers energy from an input voltage source Vin to charge capacitor 132 to V1 and transfers energy stored in capacitor 130 to the output capacitor 134.

When each of the capacitors 130 and 132 are charged by the flow control circuit 120, a lower terminal of the capacitor is connected to a lower voltage (e.g., a ground reference voltage) by voltage shifter 140. The voltage shifter is configured to shift each one of the capacitors 130 and 132 to a higher voltage when the capacitor is discharged by the flow control circuit 120 to the output capacitor 134. In this example, the voltage shifter 140 connects the lower terminal of each capacitor to a 0V reference while being charged by the flow control circuit 120 and shifts the lower terminal up to a second voltage V2 when the charged capacitor is being discharged. The shifting of the lower terminal to V2 of a capacitor 130 or 132 causes the upper terminal to the capacitor to shift to a third voltage V3 equal to the shifted voltage added to the voltage stored by the capacitor (i.e., V3=V1+V2). Repeated discharging of the capacitor to the output capacitor 134 ultimately charges the output capacitor 134 to V3 in the absence of any load current acting upon it The voltage converter 100 also includes a fractional output control circuit 150. When enabled, the fractional output control circuit 150 pulls the upper terminal of each capacitor 130 or 132 down from V3 to a lower voltage V4 when the lower terminal of the capacitor is shifted up to V2. As a result, the output capacitor 134 is charged to the lower voltage V4 instead of the higher voltage V3. When disabled, the fractional output control circuit 150 does not pull down the voltage of the upper terminal when the lower terminal of the capacitor is shifted up to V2.

Different embodiments may include various circuit arrangements to implement the flow control circuit 120, the voltage shifter 140 and/or the fractional output control circuit 150. Some example circuit arrangements that may be used to implement these circuits are discussed with reference to FIGS. 2 and 3.

Figure 2:
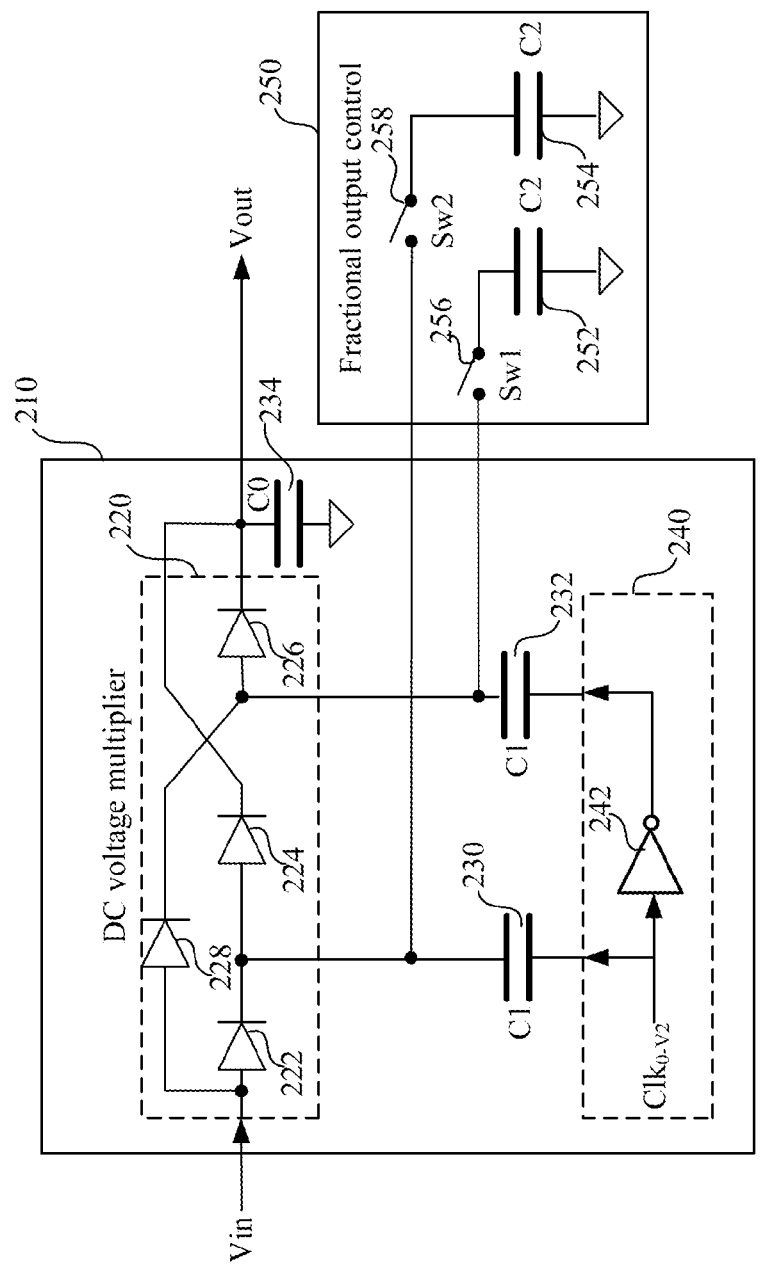
FIG. 2 shows a block diagram of a second voltage converter, consistent with one or more embodiments.

FIG. 2 shows a block diagram of a second voltage converter, consistent with one or more embodiments. The voltage converter 200 includes a DC voltage multiplier 210 and a fractional output control circuit 250. The DC voltage multiplier 210 includes capacitors 230, 232 and 234, a flow control circuit 220, and a voltage shifter 240 configured and arranged as described with reference to capacitors 130, 132 and 134, flow control circuit 120 and voltage shifter 140 in FIG. 1. The flow control circuit 220 in this example includes a set of diodes 222, 224, 226, 228 connected in series. When voltage of the first terminal of either capacitor 230 or 232 is less than V1, the diodes allow energy to pass from the input supply voltage V1 to the capacitor. When voltage of the first terminal of the capacitor is greater than V1 (e.g., when the lower terminal of the capacitor is shifted up to V2), they allow energy to flow from the capacitor 230 or 232 to the output capacitor 234 and prevent energy from flowing back to V1.

The voltage shifter 240 in this example uses a first clock signal, having an amplitude equal to a second voltage V2, to shift the voltage of the lower terminals of the capacitors 230 and 232 in the first and second modes. The low-value of the first clock signal corresponds to the first mode and the high-value of the first clock corresponds to the second mode. The voltage shifter 240, includes an inverter 242 configured to generate a second clock signal that is an inverse of the first clock signal. The voltage shifter 240 provides the first clock signal to the lower terminal of capacitor 230 and provides the second clock signal to the lower terminal of the capacitor 232. As described with reference to FIG. 1, shifting of the lower terminal to V2 causes the upper terminal of the capacitor to be shifted to V3 equal to V1+V2.

The fractional output control circuit 250 is configured to pull down the voltage of the upper terminal of each one of the capacitors 230 and 232 when the lower terminal of the capacitor is shifted to V2. In this example, the fractional output control circuit 250 includes two capacitors 252 and 254 and two switches 256 and 258. When the fractional output control circuit 250 is enabled, the switches 256 and 258 are closed to connect an upper terminal of capacitor 252 to the upper terminal of capacitor 232, and connect an upper terminal of capacitor 254 to the upper terminal of capacitor 230. When the lower terminal of the one of capacitors 230 or 232 is shifted up by the voltage shifter 240, the connected capacitor 252 or 254 of the fractional output control circuit 250 pulls the upper terminal of the capacitor 230 or 232 down to a voltage between V1 and V3. More specifically, the voltage of the upper terminal is pulled to a fourth voltage V4 specified by:

$$V4=V1+((C1*V2)/(C1+C2)),$$

where C1 is the capacitance of each of the capacitors 230 and 232, and C2 is the capacitance of each of the capacitors 252 and 254.

In some implementations, the capacitors 252 and 254 are variable capacitors that may be adjusted to adjust the output voltage Vout when the fractional output control circuit 250 is enabled. In some implementations, switches 256 and 258 may be omitted and the capacitors 252 and 254 may be respectively connected to the capacitors 230 and 232 using fixed connections.

Figure 3:
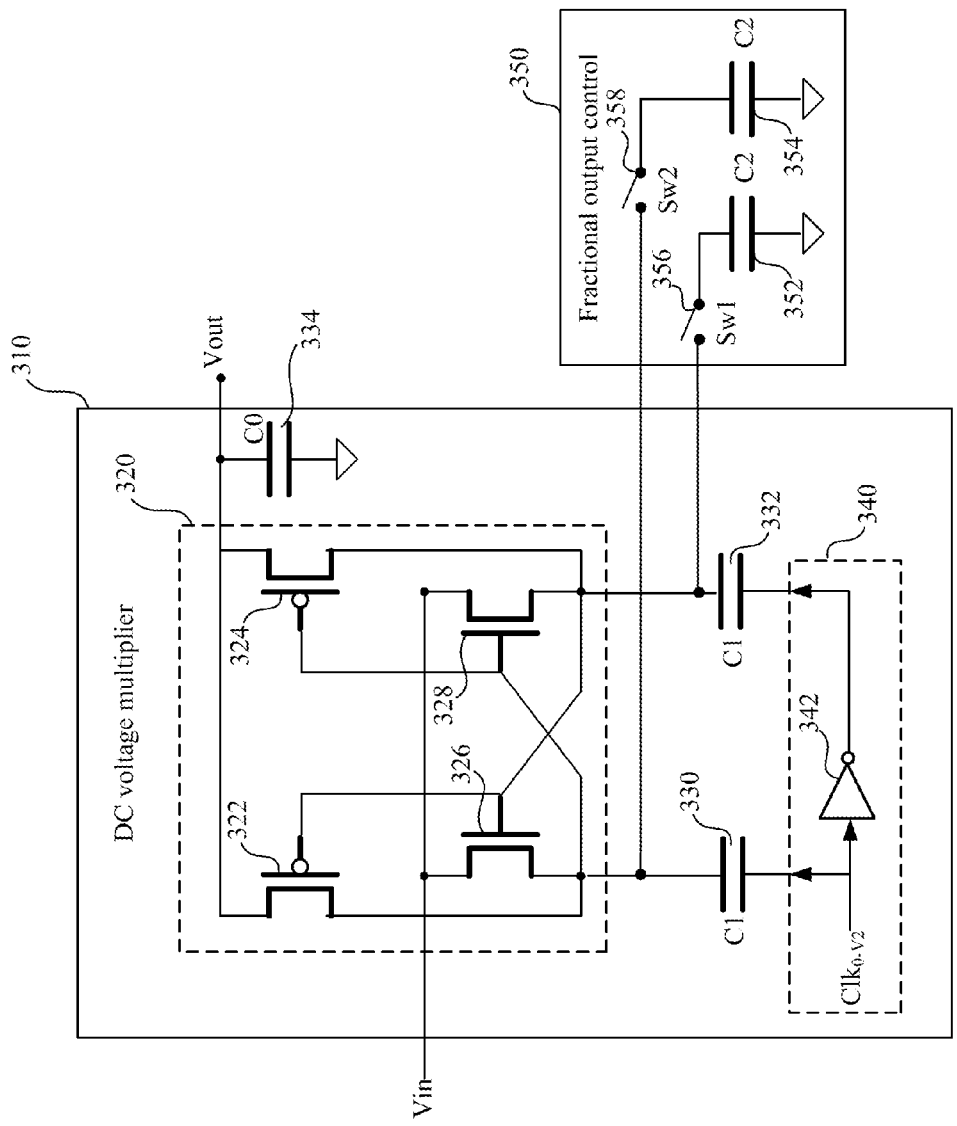
FIG. 3 shows a block diagram of a third voltage converter, consistent with one or more embodiments.

FIG. 3 shows a block diagram of a third voltage converter, consistent with one or more embodiments. The voltage converter 300 includes a DC voltage multiplier 310 and a fractional output control circuit 350. The DC voltage multiplier 310 includes capacitors 330, 332 and 334, a flow control circuit 320, a voltage shifter 340 configured and arranged as described with reference to capacitors 230, 232 and 234, flow control circuit 220, and voltage shifter 240 in FIG. 2. The voltage shifter 340 includes an inverter 342 and operates as described with reference to voltage shifter 240 with inverter 242 in FIG. 2. The fractional output control includes capacitors 352 and 354, and switches 356 and 358, which are arranged and operated as described with reference to capacitors 252 and 254 and switches 256 and 258 in FIG. 2

In this example, the flow control circuit 320 includes four transistors 322, 324, 326 and 328. When the DC voltage multiplier 310 is operated in a first mode, transistor 326 connects input voltage source Vin to capacitor 330 and transistor 322 disconnects the capacitor 330 from the output capacitor 334. Also transistor 324 connects capacitor 332 to the output capacitor 334 and transistor 328 disconnects the capacitor 332 from the input voltage source Vin. As a result, capacitor 330 is charged from Vin and capacitor 332 is discharged to the output capacitor 334. When the DC voltage multiplier 310 is operated in a second mode, transistor 326 connects the input voltage source Vin to capacitor 332 and transistor 322 disconnects the capacitor 332 from the output capacitor 334. Also transistor 324 connects capacitor 330 to the output capacitor 334 and transistor 328 disconnects the capacitor 330 from the input voltage source Vin. As a result, capacitor 332 is charged from Vin and capacitor 330 is discharged to the output capacitor 334.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., switching and voltage). For example, in certain of the above-discussed embodiments, one or more modules are discrete logic circuits or programmable logic circuits configured and arranged for implementing these operations/activities, as in the circuit modules shown in FIG. 1. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a central processing unit (CPU) hardware-based circuit and a set of instructions in the form of firmware, where the first module includes a first CPU hardware circuit with one set of instructions, and the second module includes a second CPU hardware circuit with another set of instructions.

Based upon the above discussion and illustrations, those skilled in the art will readily recognize that various modifications and changes may be made to the various embodiments without strictly following the exemplary embodiments and applications illustrated and described herein. For example, thought aspects and features may in some cases be described in individual figures, it will be appreciated that features from one figures can be combined with features of another figures even though the combination is not explicitly shown or explicitly described as a combination. Such modifications do not depart from the true spirit and scope of various aspects of the invention, including aspects set forth in the claims.

What is claimed is:

1. An apparatus, comprising:
   a DC voltage multiplier including a first capacitor and configured and arranged to,
      in a first mode, charge the first capacitor from an input voltage source having a first voltage (V1) to store a voltage potential between first and second terminals of the first capacitor, the second terminal being set to a ground reference voltage; and
      in a second mode, after charging the first capacitor, shift a voltage of the second terminal of the first capacitor up to a second voltage (V2), shift the first terminal of the first capacitor up to a third voltage (V3), and connect the first terminal to an output node, where V3 accounts for an accumulation of voltage from V1 and V2; and
   a fractional output control circuit configured and arranged to connect a second capacitor between the first terminal of the first capacitor and the ground reference voltage, and pull the first terminal of the first capacitor down to a voltage between the V1 and V3 in response to the second terminal of the first capacitor being shifted to V2, wherein the voltage between V1 and V3 is greater than V1 and less than V3 and is set as a function of V1, V2, and capacitance values of the first capacitor and the second capacitor.

2. The apparatus of claim 1, wherein V3 is two times V1, wherein the first terminal of the first capacitor is connected to the output node and the output node is configured to charge to the voltage between V1 and V3.

3. The apparatus of claim 1 wherein:
   the first capacitor has a first capacitance (C1);
   the second capacitor has a second capacitance (C2); and
   the connecting, by the fractional output control circuit, of the second capacitor between the first terminal of the first capacitor and the ground reference voltage causes the first terminal of the first capacitor to be shifted to a voltage equal to V1+((C1*V2)/(C1+C2)).

4. The apparatus of claim 1, wherein:
the DC voltage multiplier further includes a third capacitor and is further configured and arranged to:
in the first mode, charge the third capacitor from the input voltage source to store a voltage potential equal to V1 between first and second terminals of the third capacitor, the second terminal of the third capacitor being set to the ground reference voltage; and
in the second mode, shift a voltage of the second terminal of the third capacitor up to V2, thereby shifting a voltage of the first terminal of the third capacitor up to V3, and connect the first terminal to the output node; and
the fractional output control circuit is further configured and arranged to, when enabled, connect a fourth capacitor between the first terminal of the third capacitor and the ground reference voltage—thereby pulling the first terminal of the third capacitor down to a voltage between V1 and V3 in response to the second terminal of the third capacitor being shifted to V2, wherein the function is based on a ratio of a first capacitance value of the first capacitor multiplied by V2 and a sum of the first capacitance value and a second capacitance value of the second capacitor.

5. The apparatus of claim 4, wherein:
the first capacitor has the first capacitance value equal to a capacitance of the third capacitor; and
the second capacitor has the second capacitance value equal to a capacitance of the fourth capacitor.

6. The apparatus of claim 4, wherein the DC voltage multiplier further includes a voltage shifter configured and arranged to:
in the first mode, set the second terminal of the first capacitor to the ground reference voltage and set the second terminal of the third capacitor to V2; and
in the second mode, set the second terminal of the first capacitor to V2 and set the second terminal of the third capacitor to the ground reference voltage.

7. The apparatus of claim 6, wherein the voltage shifter is configured and arranged to drive the second terminal of the first capacitor with a clock signal and drive the second terminal of the third capacitor with an inverse of the clock signal.

8. The apparatus of claim 4, wherein the DC voltage multiplier further includes a flow control circuit configured and arranged to:
in the first mode, charge the first capacitor from the input voltage source and discharge the third capacitor to the output node; and
in the second mode, charge the first capacitor from the input voltage source and discharge the third capacitor to the output node.

9. The apparatus of claim 4, wherein the second and fourth capacitors are variable capacitors.

10. The apparatus of claim 1, wherein the DC voltage multiplier further includes a capacitor coupled to the output node.

11. An apparatus, comprising:
a DC voltage multiplier including first and second capacitors each having respective first and second terminals, the DC voltage multiplier and configured and arranged to:
in a first mode,
transfer energy from an input voltage source, having a voltage equal to a first voltage (V1), to the first terminal of the first capacitor;
shift the second terminal of the second capacitor to a second voltage (V2) and shift the first terminal of the second capacitor to a third voltage (V3); and
transfer energy from the first terminal of the second capacitor to an output node; and
in a second mode,
transfer energy from the input voltage source to the first terminal of the second capacitor;
shift the second terminal of the first capacitor to V2 and shift the first terminal of the first capacitor to V3; and
transfer energy from the first terminal of the first capacitor to the output node; and
a fractional output control circuit configured and arranged to, when enabled, connect a third capacitor between the first terminal of the first capacitor and a ground reference voltage and connect a fourth capacitor between a first terminal of the second capacitor and the ground reference voltage.

12. The apparatus of claim 11, wherein in response to shifting the second terminal of the first capacitor to V2, the third capacitor connected between the first terminal of the first capacitor and the ground reference voltage pulls the first terminal of the first capacitor down to a fourth voltage (V4) between V1 and V3 in response to the second terminal of the first capacitor being shifted to V2, where V4 is set as a function of V1, V2, and capacitance values of the first capacitor and the second capacitor.

13. The apparatus of claim 12, wherein:
the first and second capacitors each have a capacitance equal to C1;
the third and fourth capacitors each have a capacitance equal to C2; and
V4=V1+((C1*V2)/(C1+C2)).

14. The apparatus of claim 12, wherein V1=V2 and V3=2*V1.

15. The apparatus of claim 12, wherein V1 is not equal to V3.

16. The apparatus of claim 12, wherein the DC voltage multiplier further includes a capacitor coupled to the output node.

17. A method comprising:
using a DC voltage multiplier including first and second capacitors, generating a first output voltage (V3) at an output node that is a multiple of an input voltage; and
causing the DC voltage multiplier to generate a second output voltage, less than the first output voltage, by connecting a third capacitor to the first capacitor and connecting a fourth capacitor to the second capacitor,
wherein the generating of the first output voltage (V3) using the DC voltage multiplier includes:
in a first mode, charging the first capacitor to store a first voltage (V1) between a first and second terminals of the first capacitor; and
in a second mode, shifting the second terminal of the first capacitor to a voltage equal to V2, thereby causing the first terminal of the first capacitor to be shifted down to V3, wherein the second output voltage is between V1 and V3.

18. The method of claim 17, wherein:
the first and second capacitors each have a respective first terminal and a respective second terminal;
wherein the generating of the first output voltage (V3) using the DC voltage multiplier further includes:
in the first mode shifting the second terminal of the second capacitor to a second voltage (V2), thereby causing the first terminal of the second capacitor to be shifted down to V3; and connecting the first terminal of the second capacitor to the output node; and in the second mode charging the second capacitor to store a voltage equal to V1 between the first and second terminals of the first capacitor; and the second output voltage is greater than V1 and less than V3, wherein the second output voltage is set as a function of V1, V2, and capacitance values of the first capacitor and the second capacitor.

19. The method of claim 18, wherein:

the first and second capacitors each have a capacitance equal to C1;

the third and fourth capacitors each have a capacitance equal to C2; and the second output voltage is equal to V1+((C1*V2)/(C1+C2)).

20. The method of claim 17, wherein V1=V2 and V3=2*V1, and the second output voltage is a fraction of V3, further including:

selectively connecting the first capacitor to the third capacitor and pulling a voltage of the first terminal of the first capacitor down to V3 when the second terminal of the first capacitor is shifted up to V2; and selectively connecting the second capacitor to the fourth capacitor and pulling a voltage of the first terminal of the second capacitor down from V3 when the second terminal of the second capacitor is shifted up to V2.

* * * * *